(No Model.) 2 Sheets—Sheet 1.
J. A. JOHNSON.
TWO WHEELED VEHICLE.
No. 520,927. Patented June 5, 1894.
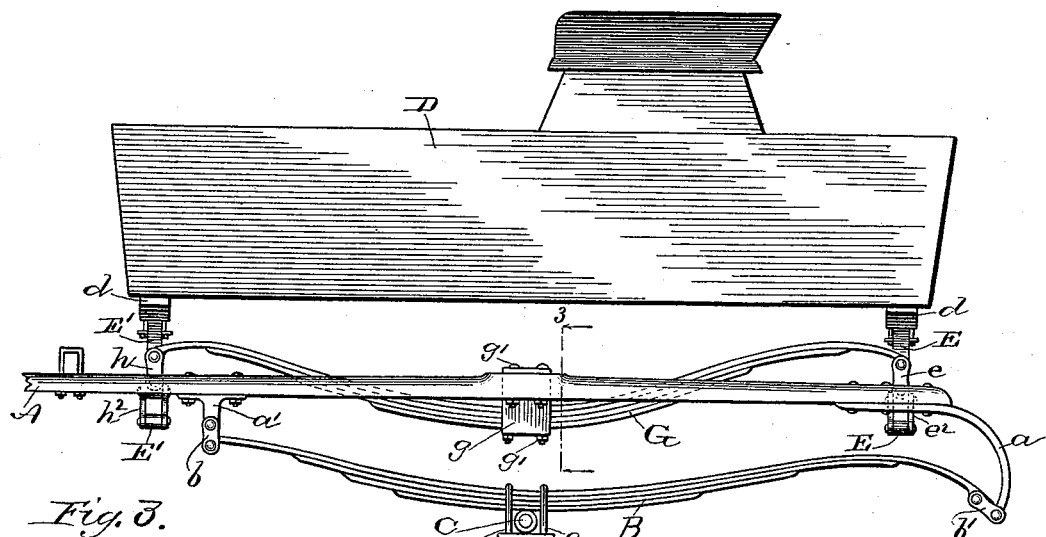
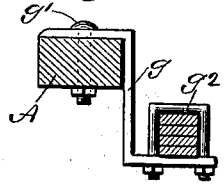
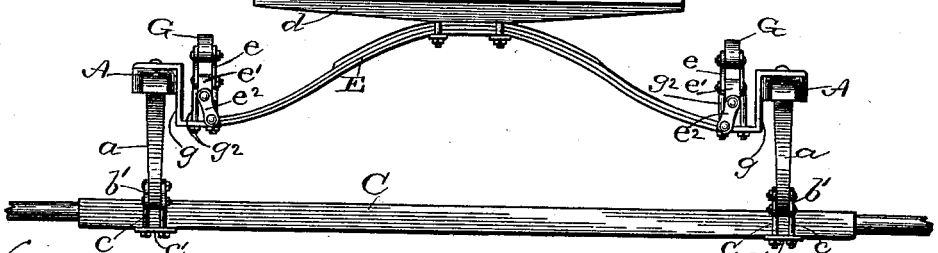
Witnesses:
W. Rossiter
H. M. Richards.
Inventor:
John A. Johnson,
By W. B. Richards,
his Atty.

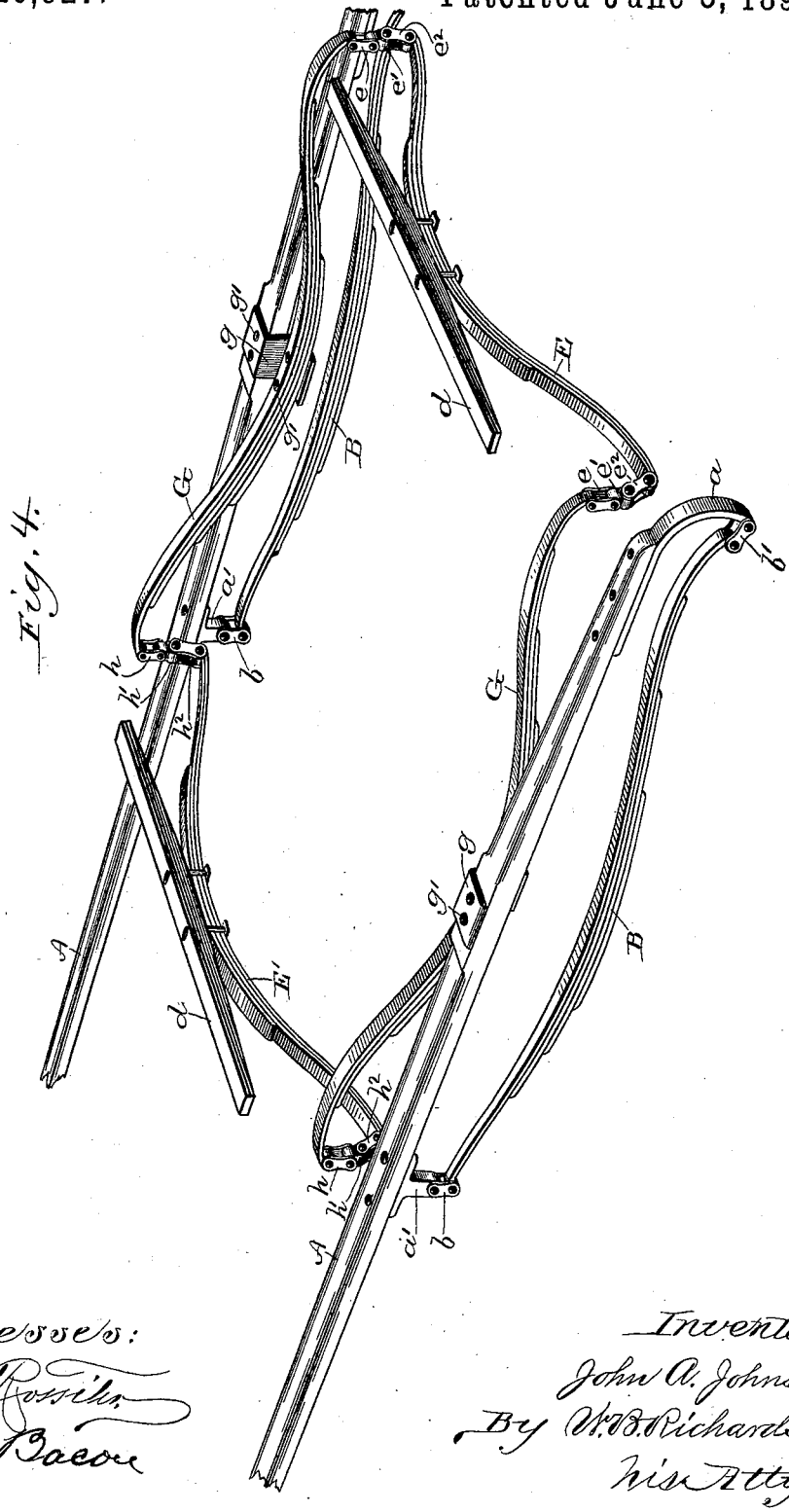

UNITED STATES PATENT OFFICE.

JOHN A. JOHNSON, OF VICTORIA, ILLINOIS.

TWO-WHEELED VEHICLE.

SPECIFICATION forming part of Letters Patent No. 520,927, dated June 5, 1894.

Application filed January 29, 1894. Serial No. 498,316. (No model.)

*To all whom it may concern:*

Be it known that I, JOHN A. JOHNSON, a citizen of the United States, residing at Victoria, in the county of Knox and State of Illinois, have invented certain new and useful Improvements in Two-Wheeled Vehicles, of which the following is a specification.

This invention relates to two-wheeled vehicles of that class generally known as road-carts. The main object of the invention is to produce a road-cart in which the thills can have a slight endwise motion with reference to the axle, and in which the body of the cart can have slight endwise and lateral motion with reference to the thills, and also with reference to the axle, whereby neither endwise sudden jerking motion nor lateral jerking motion will be transmitted to the body of the vehicle, by any such motions of the horse, or which are received by the wheels from the horse or from roughness of the roads, or from other causes. With the end of carrying out these objects of my invention, it consists in constructions and combinations hereinafter described and claimed.

I have shown my improvement, as applied to a two wheeled vehicle, in the best way now known to me, in the accompanying drawings, in which—

Figure 1 is a side elevation, without the wheels, and the front ends of the thills; Fig. 2, a rear elevation; Fig. 3, a sectional elevation, in the line 3, 3, in Fig. 1; Fig. 4, a perspective of the thills, springs, spring bars and connecting parts.

Beneath each thill A is a semi-elliptic spring B. These springs B are each laterally parallel with the thill above it. A curved bracket $a$ projects downwardly from the rear end of each thill, and another bracket $a'$ from a point farther forward on the thill. Each spring B is hinged by a link $b$ at its forward end to a bracket $a'$, and at its rear end by a link $b'$ is hinged to a bracket $a$, in such manner as to permit of an endwise motion of the thills, or forward and backward motion thereof, to a slight degree, without any corresponding motion of the axle C, to which the springs B are fixed, near their midlengths, one at each side of the vehicle body, and preferably exterior to said body, by ordinary stirrups $c$ and bridle bars $c'$, as shown at Figs. 1 and 2.

The vehicle body D is fixed to the spring-bars $d$ in an ordinary manner, and the spring-bars $d$ are in turn fixed, one to each of the semi-elliptic springs E, E'. The rear spring E, is hinged by links $e$, $e'$, $e^2$, at each of its ends to the ends of side springs G of semi-elliptic form. These side springs G are fixed near their midlength portions by hangers $g$, one to each thill. These hangers $g$ may be a simple angle plate, bent at two points in opposite directions, to which the thill and its respective spring are fixed by bolts $g'$, as shown at Figs. 1 and 4, or they may be connected by a stirrup $g^2$, as shown at Figs. 2 and 3. The forward ends of the springs G support the transversely located, semi-elliptic spring E', by links $h$, $h'$, $h^2$, at each of its ends. The links $e$, $e'$, $e^2$, and $h$, $h'$, $h^2$, permit the springs E, E' to swing laterally of the vehicle, or endwise of themselves, and thus allow the vehicle body to swing laterally with reference to the thills and the springs G, and also allow the vehicle body to swing forwardly and rearwardly with reference to the vehicle and to the thills and springs G.

The different movements permissible of the vehicle body, with reference to the thills and springs G, and the movement of the thills in respect to the axle, as hereinbefore described, renders this vehicle pleasant and desirable to ride in, removing fully, as it does, all jerking movements of the vehicle, arising from jerking and irregular movements of the draft animal, or from the vehicle being thrown in any direction by roughness of the roadway over which it passes.

It will be evident that the springs E, E', may be hinged to the springs G from what I have shown, and in fact that the forward spring E' may be dispensed with, and a crossbar used, fixed to the thills, and to which the spring E' may be hinged. Hence I do not limit my claims to springs connected by the specific hinges herein described, and shown in the accompanying drawings.

Having thus described my invention, what I claim as new, and desire to secure by Letters Patent, is—

1. In a two wheeled vehicle, and in combination with the body, thills and wheels thereof, the springs B, hinged at their ends to the thills and fixed at their midlength parts to the axle, the springs G fixed at their midlength parts to the thills, and hinged to and supporting the springs E, E', at their ends, substantially as and for the purpose specified.

2. In a two wheeled vehicle, and in combination, the thills A, springs B fixed to the axle at or near their midlength portions, and hinged to the thills at their ends, beneath which thills they are located, springs G, fixed at or near their midlength parts to the thills, and hinged at their ends to transverse springs E, E', which support the vehicle body and are supported by the springs G, substantially as and for the purpose specified.

3. In a two wheeled vehicle, and in combination with the body, wheels and thills thereof, semi-elliptic springs, one of which is hinged at each end to each of the thills above it, and both of which are fixed at their midlength parts to the axle, semi-elliptic springs fixed at their midlength parts to the thills, and transverse springs hinged to and supported by the springs which are fixed at their midlength to the thills, substantially as described.

4. In a two wheeled vehicle, and in combination with the body, thills and wheels thereof, semi-elliptic springs, fixed at their midlength parts to the axle, hinges on each of said springs connecting them with the thills and permitting limited endwise movements of the thills and springs with reference to each other, semi-elliptic springs fixed at their midlength parts one to each thill, a transverse spring at each end of the springs which are fixed to the thills at their midlength parts, and hinges connecting the transverse springs and adjacent semi-elliptic springs and permitting limited endwise movements of the transverse springs with reference to the thills, axle and wheels, substantially as described and for the purpose specified.

In testimony whereof I affix my signature in presence of two witnesses.

JOHN A. JOHNSON.

Witnesses:
ALFRED JOHNSON,
JAMES PETERSON.